(No Model.) 3 Sheets—Sheet 1.
S. H. CAUFFIEL.
OVERHEAD TROLLEY SYSTEM FOR ELECTRIC RAILWAYS.
No. 588,053. Patented Aug. 10, 1897.
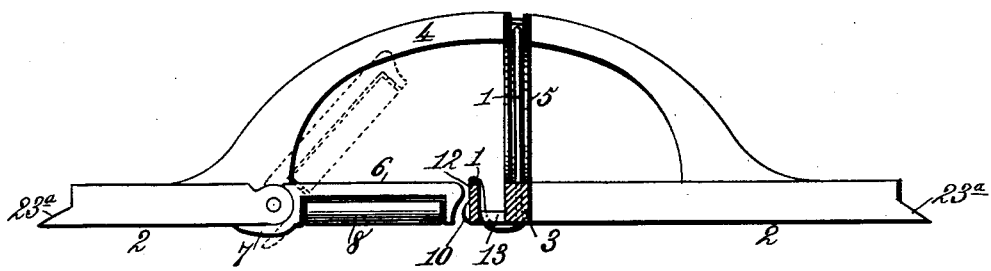
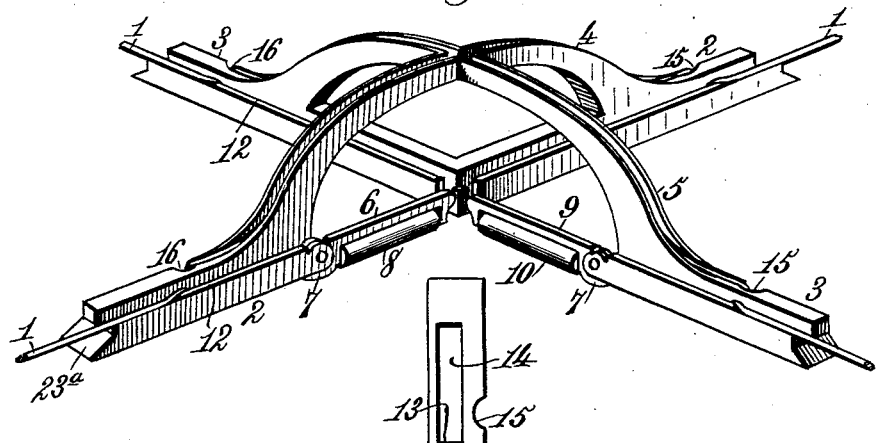
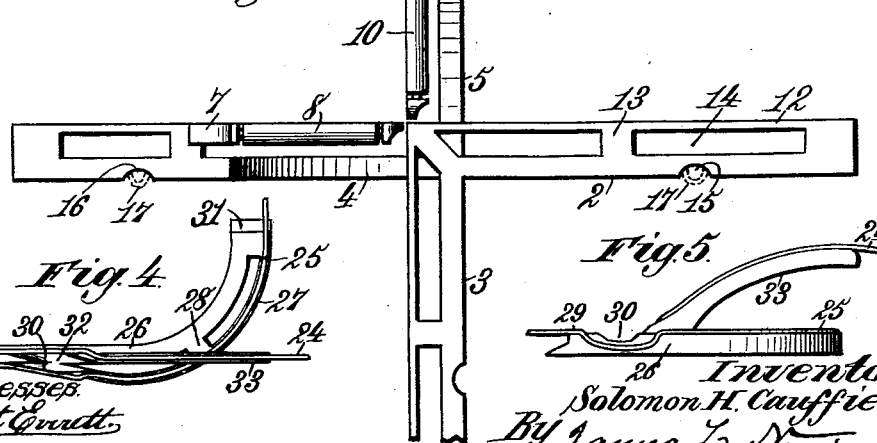
Witnesses
Robert Everett
Dennis Sumly
Inventor:
Solomon H. Cauffiel.
By James L. Norris
Atty.

(No Model.) 3 Sheets—Sheet 2.
S. H. CAUFFIEL.
OVERHEAD TROLLEY SYSTEM FOR ELECTRIC RAILWAYS.
No. 588,053. Patented Aug. 10, 1897.
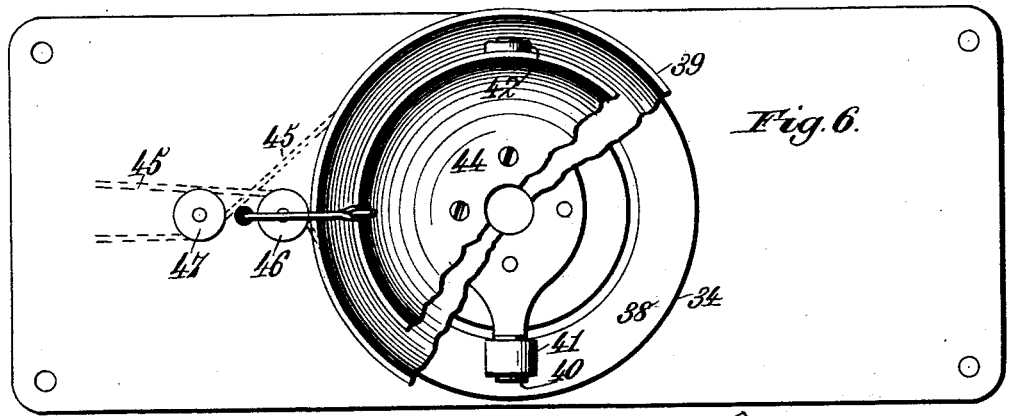
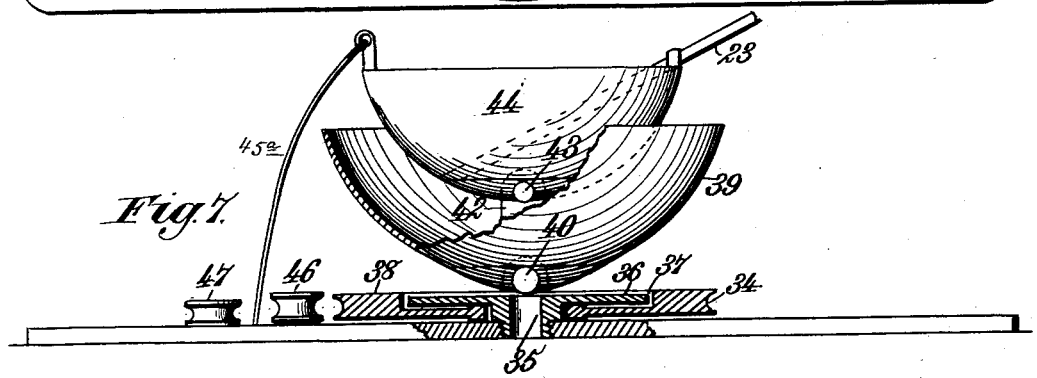
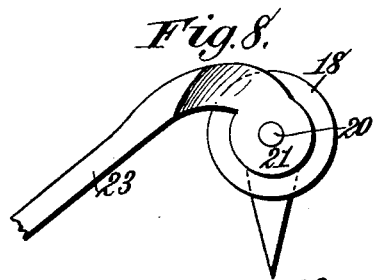
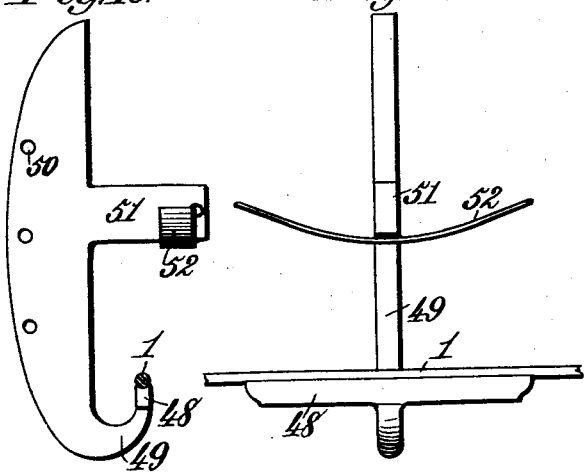
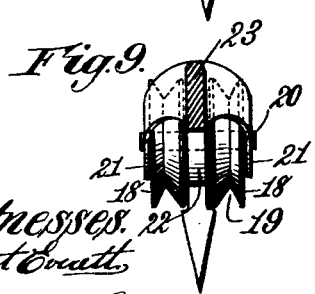
Witnesses.
Inventor.
Solomon H. Cauffiel.
By James L. Norris
Atty.

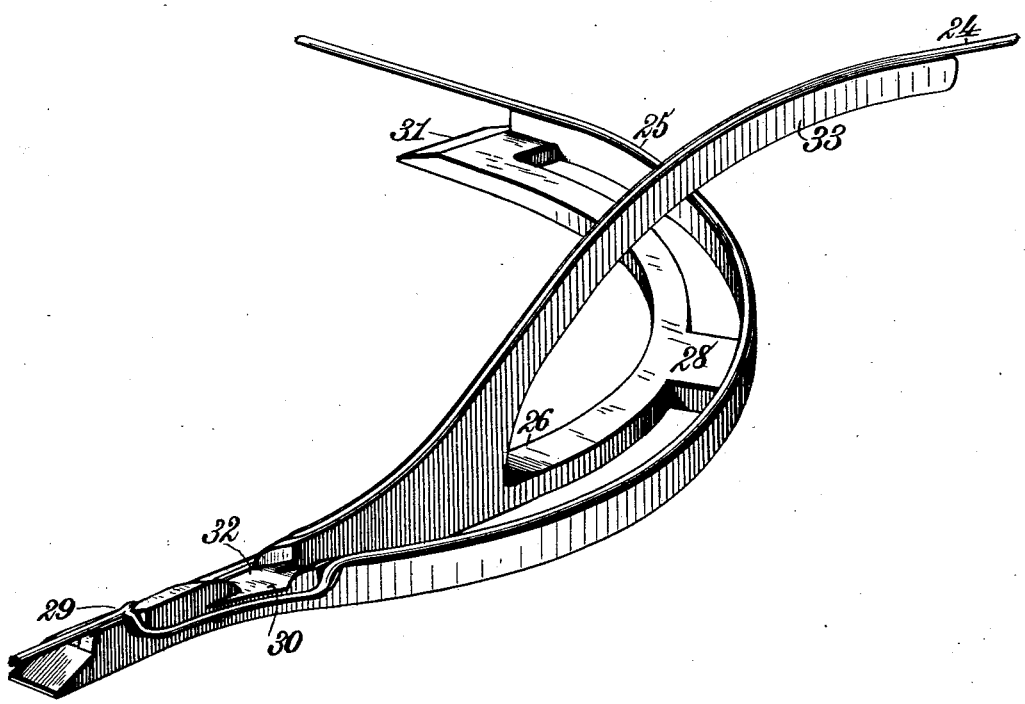

UNITED STATES PATENT OFFICE.

SOLOMON H. CAUFFIEL, OF JOHNSTOWN, PENNSYLVANIA.

OVERHEAD-TROLLEY SYSTEM FOR ELECTRIC RAILWAYS.

SPECIFICATION forming part of Letters Patent No. 588,053, dated August 10, 1897.

Application filed July 24, 1896. Serial No. 600,366. (No model.)

*To all whom it may concern:*

Be it known that I, SOLOMON II. CAUFFIEL, a citizen of the United States, residing at Johnstown, in the county of Cambria and State of Pennsylvania, have invented new and useful Improvements in Overhead-Trolley Systems for Electric Railways, of which the following is a specification.

My invention relates to overhead-trolley systems for electric railways, the object thereof being as follows:

I propose to furnish electrical railways using the overhead trolley with an organization and system which is automatic throughout and whereby the trolley upon any line shall be able to pass any intersecting line upon a continuous support and in the normal line of movement without requiring attention from the conductor or motorman, without employing special devices operated by springs or other means, and without dividing the wires, the results accomplished by my invention being unaltered by variations in the angle of intersection of the road-lines and being applicable with the same advantages to those points where side tracks, branch lines, or other divergences of the road may take place.

It is my object more particularly to provide a system of automatic control for roads using "upper-touch" trolleys which run upon or above the wires, my aim being to enable such trolleys to cross intersecting or branch lines and to pass cross-lines at any angle or curve without slackening speed, without raising or otherwise manipulating the trolley, without the exercise of any function upon the part of the motorman or conductor, without dividing the wires which are crossed without break, and without interruption of the continuous line of support for the trolley passing the point of intersection or crossing, the conducting and supporting structure being simplified by largely reducing the number of operative parts, avoiding the use of weights, springs, or levers and relying upon gravity alone for the operative action of the parts.

It is a further purpose of my invention to provide an improved support for the trolley-pole, whereby it may not only have a greater range of automatic movement or adjustment, but have the capacity to make engagement with the contact-wire with substantial evenness by gravity.

It is my purpose, also, to simplify and improve the construction and operation of the trolley to enable it to be easily and instantaneously controlled in such manner that it may be caused to follow one of a plurality of intersecting lines, to render its engagement with the conducting-main more secure and to provide effectual safeguards whereby it shall be kept from leaving the wire unintentionally, to provide for its operative use in reverse directions, and to prevent the shocks or jars by which it is sometimes thrown upward and separated from the conductor.

My invention also contains other novel features; and it consists in the novel parts and combination of parts and in the several constructive improvements hereinafter fully explained, and then particularly pointed out and defined in the claims which conclude this specification.

For the purposes of the following description reference will be had to the accompanying drawings, in which—

Figure 1 is a sectional elevation showing two cross-lines of overhead conductors equipped with my invention. Fig. 2 is a detail perspective view of the same. Fig. 3 is an inverted plan view of the same. Fig. 4 is a plan view, upon a considerably-reduced scale as compared with other figures of the drawings, showing the application of the invention to the junction of a main line and branch, side, or switch line. Fig. 5 is a side elevation of the junction and branch line shown in Fig. 4. Fig. 6 is a plan view showing the trolley-base. Fig. 7 is a sectional side elevation showing the base and universal joint for the trolley-pole. Fig. 8 is a detail view showing the construction of the trolley and the manner of mounting it upon the trolley-pole. Fig. 9 is an end elevation of the parts shown in Fig. 8. Fig. 10 is a detail view showing one of the supports for the conducting-wire. Fig. 11 is a front elevation of the parts shown in Fig. 10. Fig. 12 is a perspective view, on an enlarged scale, of the parts shown in Figs. 4 and 5.

The reference-numeral 1 in said drawings indicates an electric conductor of the kind ordinarily used in systems of overhead conduction with a trolley riding upon and supported by the said conductor. The wire 1 may be sustained by any preferred form of structure mounted upon center poles, side poles, or other supports. I prefer, however, to employ the improved device shown in the drawings and explained hereinafter in its order, whereby I secure a marked simplicity, economy, and efficiency, besides giving the riding trolley a smoother movement, avoiding the shocks and jars which might separate it momentarily from the wire and cause injurious sparking or might even throw it entirely off.

At those points where separate lines cross each other, as well as at the intersections of a branch road, switch, siding, or other lines with a main line, I provide the following simple means for enabling the trolley on either line to pass on a continuous or practically unbroken line of support and for carrying the conductors over the point of crossing or intersection without dividing the same or making any break in the continuity of either circuit. As the angles and other conditions under which the invention is applicable are subject to a wide variation I will briefly describe an example of each of the leading types.

I will take, first, the form shown in Figs. 1 to 3 of the drawings, in which two distinctly separate lines cross, either at angles of ninety degrees or at such other angles as may be used. In the figures referred to the angles are right angles, but variations therefrom do not affect or require changes in the invention. I provide at the point of crossing or intersection a supporting structure consisting of four arms 2 2 and 3 3, extending a suitable distance from the point of crossing or intersection. These arms are made of metal or any material suitable for the purpose, and when formed of metal they may be cast or struck up in suitable dies in a single structure, which materially reduces the expense of manufacture, besides giving a stronger and more durable article. Forming part of the arms 2 2 is a span 4, which rises from one of said arms by a gentle curve in the same vertical plane with the arms of which it forms part and descends by a like curve to the other arm. I may mention, however, that in this form of the invention the curvatures or other forms of the span are for appearance only, as the span might be of any other shape, the only object being to provide a support running over the point of intersection of the arms at a suitable height above the same. A similar span 5 unites the arms 3.

One of the arms 2 is terminated at the point where it unites with the span, while the other extends to the point of crossing and unites with the similarly-extended arm 2, the other arm 3 terminating at the span, as described in regard to the one arm 2. To the end of the arm 2 last named, at the foot of one end of the span 4, is pivotally attached a bar 6, having such shape and length that it practically forms a continuation of the arm to which it is pivoted, its free end normally lying by gravity close to the point of intersection and in the same plane with the other arms. It is sustained in this position by a lug projecting beneath the arm to which it is pivoted. Upon the lower side of and parallel with said bar is a long roll 8, journaled in lugs at or near the ends of the bar. A substantially similar bar 9, having a like roll 10, is pivoted to and supported by the end of one of the arms 3 at the foot of the span 5. It will be observed that these bars are at a right angle one to another, or, in other words, at an angle coinciding with that at which the two lines intersect.

Each arm 2, as well as the pivoted bar, is provided with a rigid supporting-rail 12, which is connected to the arm or bar by laterally-projecting lugs 13, arranged at suitable intervals, leaving intermediate open spaces 14. The lugs 13 unite with the lower edge of the rail, so that the upper edge forms a practically continuous rail, so narrow that a trolley can run thereon, one of its flanges lying in the space between the rail 12 and the arm to which it is connected. Each rail lies at a sufficient distance from the span parallel with it, so that the trolley will easily pass without touching the span.

I have already stated that the conductors 1 may be supported by any suitable means, but when they reach the structure described they pass upon the edges of the supporting-rails 12, to which they are united by solder or in any other suitable manner. I prefer to form shallow channels in the upper edges of said rails for the wires to lie in, as this construction strengthens the union effected by the solder.

A little distance before reaching the foot of the span upon the arm parallel with and supporting the rail on which the wire is soldered the latter is deflected from the top of said rail and carried down between the latter and the arm, passing through one of the open spaces 14 between the lugs 13. It is then carried beneath the arm and brought into a notch or cavity 15 in the outer vertical face of the arm. When lying in this space, it is in or nearly in line with the longitudinal center of the upper face of the arm and span and close to the foot of the latter. From this point it is led over the upper surface of the span and down to the surface of the arm at the other end of the span. Here it passes downward in a notch 16, similar to the notch 15, is carried under the arm and brought into the opening 14, passing upward through the latter and emerging again upon the upper edge of the rail 12, along which it is led until it passes off the end, solder or other suitable means being used to properly secure it. That portion of the wire between the point where it leaves the rail 12 and where it returns to it is thoroughly coated and insulated to prevent its charging the structure with current.

It is suspended at the proper point by any preferred form of support, eyes or staples 17 being provided for this purpose.

Before proceeding with a description of other parts of my invention I will describe the trolley and the manner in which the latter operates in connection with the parts already explained.

The trolley and part of the trolley-pole are shown in Figs. 9 and 10. I use a double trolley having two rolls 18, each provided with a channel 19. The lowest "point" or "apex" thereof, so to speak, is nearer the outer flat face of the roll than it is to the other face. The rolls 18 are carried by a shaft 20, the ends of which have support in two nearly circular plates 21, which lie close to and parallel with the outer faces of the two trolley-rolls. These plates form part of wing-plates 21, which curve upward a little above the top of the rolls and then bend around in front of the latter and unite with a central piece 22, which is considerably thicker and lies between the rolls, giving a central support to the shaft 20. At their point of union the wings also unite with the trolley-pole 23, which is mounted upon a trolley-base in the manner hereinafter described.

Each of the arms 2 is provided at its outer end with an outwardly and downwardly inclined face 23ª, which lies underneath and close to the conductor 1. As the trolley-roll, riding upon the upper side of said conductor, reaches the end of one of said arms 2 it comes in contact with this inclined face and rides up thereon. The inclination of this face enables the roll to pass over the end of the arm with less shock than it would sustain if the end of the arm 2 was square. As the trolley-roll passes along the top of the arm 2 the trolley-pole 23 comes against the friction-roll 8, carried by the bar 6, which lies at an angle with the arm on which the roll is traveling, and as the roll 18 proceeds the said friction-roll rides upon the inclined top of the pole until it and the bar carrying it assumes substantially the position shown in dotted lines in Fig. 1. This leaves the space between the point of intersection and the point of pivotal attachment of the bar 6 entirely open for the passage of the trolley and pole. As the trolley-roll passes the point of intersection of the two lines the roll 8 rides off the highest point of the trolley-pole and wings and the bar 6, carrying the friction-roll 8, drops by its own gravity back to the position indicated by full lines in Fig. 3, being supported in this position by its lug 7, in which it furnishes support for the trolley upon the other intersecting line.

In those cases wherein a side or branch line or a switch line of any kind meets a main line my invention is slightly modified. In this arrangement the dimensions of the parts in practice will be such that the trolley-wheel may ride upon the main conductor, passing the branch-conductor rail without contact between said branch rail and the trolley-pole, so that the trolley-wheel may pass uninterruptedly along the wire 24. Let it be supposed, as an example, that the main conductor 24, Figs. 4, 5, and 12, unites with a laterally-diverging conductor 25, which is on a simple curve of any radius, the purpose being to enable the trolley of a car on the main line to remain upon the latter, or to take the side line at the will of the motorman or conductor, or to enable the trolley on the side line to pass automatically therefrom and go upon the main conductor. Under these conditions I provide a frame consisting of a horizontal bar 26, curved to substantially follow the line of the lateral conductor. In the same horizontal plane and removed by a narrow interval from the convex side of the bar is a rail 27, connected to the bar by projecting lugs 28 at intervals, their ends uniting with the lower edge of the rail. The bar 26 curves through such an arc that its ends are brought into line with the main conductor and the lateral conductor, respectively. At the end which is in line with the main wire 24 the rail 27 converges slightly toward the bar, and near the end of the latter it unites with it.

The wire 24 is led to the end of the bar 26 and is connected to its extremity by solder or in any suitable manner. At the point of this attachment, which is indicated by the numeral 29, it also unites with the end of the side wire 25. The latter is deflected to and bent down upon the convex face of the bar 26, along which it is led, as seen in Fig. 4, until it has passed a sunken recess 30, formed in the rail 27 at the point where its converging end unites with the bar 26. One wall or edge of the notch is coincident with the vertical face of the bar 26 and the other is parallel to it, the interval being such as to permit the flange of the trolley-wheel coming upon this end of the bar on the main conductor to traverse the notch without obstruction. After the wire 25 returns to the top of the rail 27 it extends along the same, being secured as already described in Figs. 1 and 2. At the end of the rail it passes off over a buffer 31, similar to that shown in Fig. 2, and is supported by the ordinary means. The main conductor 24, after it unites with the side wire, is deflected laterally and bent over the concave face of the bar 26 until it passes a notch or sunken recess 32, which is formed in a gradually-rising rail edge 33, having its lowest point at or about the middle line of the notch 30. The rail edge 33 rises to such a point that a trolley on the rail 27 can easily pass beneath it, and it extends in a vertical plane coinciding with the direction of the main wire 24 until it has passed completely over and, preferably, somewhat beyond the curved part of the bar 26 and rail 27. The wire 24 passes off its elevated end and is thence supported by the ordinary conductors. If desired, it may return by a suitable decline to its former level, or substantially so.

Suppose now that a trolley comes upon the rail 27 and wire 25 from the side line. It will follow the curved rail until it reaches the notch 30, and if allowed to follow its own course its flange would pass through the said notch and be guided by the rail until it passes automatically upon the wire 24 at the extremity of said rail and bar. On the other hand, a trolley moving in the opposite direction and coming on the bar 26 at or near the point 29 will normally follow the said conductor and pass up over the rail edge 33. If it is necessary to take the side wire 25, the motorman or conductor merely adjusts the swiveling base of the trolley-pole just as the car reaches the end of the bar 26, so that the flange of the trolley-wheel adjacent to the concave face of the bar makes a small angle with the line of the main conductor, the apex of said angle pointing in the direction of movement. As the wheel reaches the notch 30 said flange naturally enters the latter, thereby carrying the wheel off the main wire and guiding it upon the wire 25 just at the point where the latter returns to the edge of the rib 27.

By reference to Fig. 9 it will be seen that the trolley-rolls, being arranged upon the sides of the pole, either of said rolls can traverse the conductor without the pole being interfered with by that portion of the track 25 which leaves the main conductor at one side and crosses beneath it to the other side.

The trolley-pole 23 is supported upon a trolley-base on the car, which consists of the following parts:

A pulley 34 is arranged horizontally on a suitable part of the car-top, where it has bearing upon a vertical hollow shaft 35, which is preferably secured into a threaded seat. The upper end of the shaft has a large circular plate 36, which lies in a countersunk space 37 in the upper face of the pulley to give the latter steadiness and prevent play on its shaft.

Upon the upper flat annular face 38 of the pulley 34 at diametrically opposite points is mounted a concavo-convex shell 39, having nearly oval form, journals 40 being provided in the line of its major axis, which lie in keepers 41, engaging the face 38 at opposite points. The journals 40 are substantially in line with the bottom of the shell, and between this point and the open top bearings 42 are provided in the concave face of the shell and in the same vertical plane with the journals 40 or in the line of the major axis of the shell. These bearings receive the ends of a shaft 43, which supports the bottom of a second and substantially similar shell 44, which is partly contained in and in part rises above the shell 39. The end of the trolley-pole 23 is secured to the shell 44, usually having its end in the interior somewhat below one edge and resting on the other edge. The grooved periphery of the pulley 34 receives a sprocket chain, belt, or cord 45, which is crossed after leaving the pulley, and one end is brought over a smaller pulley 46, and the other end is led beneath said pulley and over a second pulley 47. Thence they pass in parallelism to such a point that they may be operated by the proper person.

The numeral 45$^a$ indicates a flexible cord or wire, which is secured at one end to the edge of the upper shell 44 and passes into the car through the roof thereof, as illustrated in Fig. 6, to within reach of the operator.

The arrangement of the parts just described permit of the widest possible range of vertical adjustment of the trolley and its reversal with facility, and the operation of such parts is as follows: Suppose the trolley to be lying upon the conductor in the position it ordinarily assumes when the car is traveling in a given direction and it is desired to reverse the movement of the car. The operator draws upon the cord or wire 45$^a$, thus rocking the upper shell 44 upon its journal and raising the trolley from the wire until the edge of said shell engages the edge of the lower shell 39. By reason of the contact there will be increased resistance to the pulley. The trolley has then left the conductor. If a greater elevation of the trolley is required, a more forcible pull upon the cord or wire 45$^a$ will now rock both shells, the lower one by reason of the engagement therewith of the upper, and in this way the range of adjustment of the trolley is adequate for all purposes. The operator may now reverse the position of the trolley upon the conductor by drawing upon the cord or wire 45, rotating the pulley 34 and the mechanism mounted thereon, reversing the position of the trolley as will be apparent. When the reversal has been accomplished, the operator releases the cord or wire 45$^a$, when by gravity the trolley-pole and the trolley will rock the upper shell 44 until the edge thereof engages the lower shell 39, when both will rock upon their journals in unison until the trolley rests upon the conductor. In this movement the cord or wire 45$^a$ will have followed the movement of the shells in rotating and will be in position to raise the trolley from the conductor when it is again desired to reverse the position of said trolley.

It will be apparent that the manner of supporting the trolley-pole shown and described will permit it to accommodate itself to variations in height or otherwise of the conductor.

I prefer to use as supports for the conductor the means shown in Figs. 10 and 11, in which 48 indicates a short bar similar to the section of one of the rails already described. It is preferably made of insulating material, with a shallow channel for the wire, and has support on a central bracket 49, consisting of a plate lying transversely to it. The bracket curves downward and laterally and then, with a greater width, upward. It has apertures 50 to admit nails or screws and a horizontally-projecting plate 51, which extends beyond the wire some distance above the same. A spring 52 may be applied to the lower edge of this extension to take up the shock of a fast-running trolley.

One object in using the two shells 39 and 44 is to obtain a large range of movement of the trolley-staff 23. By my invention I can easily adjust the same at any point between a horizontal and a vertical line, whereas if a single shell only be employed the range of movement would be less.

As the trolley-wheel in my invention is grooved and rests upon the conductor, its contact with the latter is preserved by the gravity of the parts, and no special devices are required to force it into contact with the wire or maintain it thereon.

As electric cars are frequently run at considerable speed and may at times have a very high speed, it is possible that the trolley-roll, riding upon the top of the conductor, may strike the end of the bar 48 with sufficient force to cause it to leave the conductor and bound upward. In such a case the spring 52 will arrest the upward movement and take up the shock.

What I claim is—

1. In a system of electric conductors, a structure for cross-lines of wire, consisting of intersecting arms having crossing spans, and pivoted self-sustained bars forming part of two of said arms, the said bars lying at right angles and having their free ends lying close to the point of intersection, substantially as described.

2. In a system of electric propulsion, the combination with intersecting or crossing conductors, of a structure consisting of intersecting arms having crossing spans carried above the crossing, pivotally-mounted bars at right angles, each bar forming part of one of said arms, its free end lying normally close to the crossing, its pivoted end having a sustaining-lug, and an upper-touch trolley having a pole adapted to engage and lift the pivoted bar, substantially as described.

3. In a system of electrical propulsion, the combination with a crossing structure having four arms provided with rails which meet at a common point, of two pivoted bars forming part of two of said rails, their free ends lying at the common point and at an angle to each other, overhead spans crossing said point to carry the wires, and an overrunning or upper-touch trolley adapted to move on one of the rails and pivoted bars, and to raise the other pivoted bar to permit its passage, substantially as described.

4. In a crossing structure for electric wires and trolleys, a plurality of rigidly-connected arms intersecting at a common point, said arms having rails running alongside and parallel with them, conducting-wires mounted on said rails and leaving the latter at the feet of spans which cross each other above the rails, and which carry the wires over the point of intersection, a bar pivotally attached at one end to the end of one of the rails on one side of the common point and having its free end sustained close to the common point, said bar forming part of a line of support for a trolley, and a trolley-pole having wings in front rising as high as the top of the trolley to raise an intersecting bar to permit the passage of the trolley, substantially as described.

5. In a crossing structure for electric wires and trolleys, a plurality of rigidly-connected arms intersecting at a common point, said arms having rails running alongside and parallel with them, conducting-wires mounted on said rails and leaving the latter at the feet of spans which cross each other above the rails, and which carry the wires over the point of intersection, a bar pivotally attached at one end to the end of one of the rails on one side of the common point and having its free end sustained close to the common point, said bar forming part of a line of support for a trolley, and a trolley-pole having wings in front rising as high as the top of the trolley to engage a friction-roll extending along the lower face of said bar and raise the latter, substantially as described.

6. A crossing structure for conducting-wires and trolleys, comprising intersecting arms having rails, part of the rails having pivoted, self-sustained bars, one of which forms part of the support for a trolley, while another is raised by the inclined pole of said trolley, substantially as described.

7. A base for a trolley-pole, having independent, concavo-convex shells one of which is pivoted by a shaft at its bottom within the other, and the latter pivoted in the same vertical plane to a pulley arranged horizontally, the trolley-pole being mounted upon and partly within the upper shell, substantially as described.

8. In an electric street-railway system, a switch structure consisting of a rigid horizontal bar, a main rail carried by said bar, a rail edge curved upward at a point near one end of the horizontal bar to carry the main wire and rising to a suitable height above said bar, and a laterally-diverging continuation of said horizontal bar from a point at or near that where the upwardly-curved rail begins, said continuation being curved horizontally and laterally beneath the upwardly-curved rail and into the line of a side branch, or switch-track, and a side rail and conductor on said laterally-divergent continuation, the side rail and main rail being each provided with a notch crossing the same at an angle, substantially as described.

9. In a switch or other union of a main and a diverging line of electrical conductors, the combination with a horizontal bar of a rail edge rising from it near one end and extending to a suitable height above the other end of the horizontal bar which is curved, a main wire supported on the said rail edge, a diverging wire on a rail carried by the bar, said wires being removed from and carried past notches in the rail and rail edge, and a double or two-wheeled trolley having a central guide hanging from a point between the trolley-wheels to guide either to its engagement with the wire, substantially as described.

In testimony whereof I have hereunto set my hand in presence of two subscribing witnesses.

SOLOMON H. CAUFFIEL.

Witnesses:
PHILIP N. TILDEN,
HOWARD M. NORRIS.